US012624252B2

(12) United States Patent
Kim et al.

(10) Patent No.: US 12,624,252 B2
(45) Date of Patent: *May 12, 2026

(54) AQUEOUS DISPERSION COMPRISING INORGANIC PARTICLES

(71) Applicant: BEAD ORIGIN INC., Gyeonggi-do (KR)

(72) Inventors: Taesung Kim, Seoul (KR); Donggeon Kwak, Gyeonggi-do (KR); Junho Yun, Gyeonggi-do (KR); Jae-Do Nam, Seoul (KR); Na Yeon Kim, Seoul (KR)

(73) Assignee: BEAD ORIGIN INC., Gyeonggi-do (KR)

( * ) Notice: Subject to any disclaimer, the term of this patent is extended or adjusted under 35 U.S.C. 154(b) by 102 days.

This patent is subject to a terminal disclaimer.

(21) Appl. No.: 18/289,982

(22) PCT Filed: May 12, 2022

(86) PCT No.: PCT/KR2022/006798

§ 371 (c)(1),
(2) Date: Nov. 8, 2023

(87) PCT Pub. No.: WO2022/240209

PCT Pub. Date: Nov. 17, 2022

(65) Prior Publication Data

US 2024/0263040 A1 Aug. 8, 2024

(30) Foreign Application Priority Data

May 12, 2021 (KR) ........................ 10-2021-0061195

(51) Int. Cl.
*C09G 1/02* (2006.01)
*C01F 17/235* (2020.01)
*C09K 3/14* (2006.01)

(52) U.S. Cl.
CPC .............. *C09G 1/02* (2013.01); *C01F 17/235* (2020.01); *C09K 3/1409* (2013.01);
(Continued)

(58) Field of Classification Search
None
See application file for complete search history.

(56) References Cited

U.S. PATENT DOCUMENTS 4,859,432 A 8/1989 David et al.
4,965,057 A * 10/1990 David .................... B82Y 30/00 423/263

(Continued)

FOREIGN PATENT DOCUMENTS

EP 3957699 A2 2/2022
JP S63-239109 A 10/1988

(Continued)

OTHER PUBLICATIONS

Duadu et al., "The Role of Ce3+ vs. Ce4+ During the Polishing of Silicon Dioxide and Silicon Nitride Films Using Ceria Abrasives", Imaging and Applied Optics and Technical Digest, [Retrieved from the internet]: https://opg.optica.org/view_article, p. 1-8, (Jan. 1, 2012).

(Continued)

*Primary Examiner* — Shamim Ahmed
(74) *Attorney, Agent, or Firm* — Christensen, Fonder, Dardi; Diane E. Bennett; Peter S. Dardi

(57) ABSTRACT

Inorganic particles comprised in an aqueous dispersion according to the present invention consist of agglomerates of crystalline and amorphous microparticles, and exhibit spherical and smooth surfaces. The spherical appearance, low crystallinity, and narrow particle size distribution of the inorganic particles are further advantageous in reducing scratch defects in a CMP process. In addition, since the
(Continued)

microparticles on the inorganic particle surfaces provide more active sites and thus the removal rate is high, the inorganic particles may be advantageous as next-generation CMP polishing materials. In addition, the aqueous dispersion according to the present invention further comprises an amino acid, and the amino acid may be adsorbed on a surface of a silicon oxide wafer to strengthen electrostatic attraction between the silicon oxide wafer and the inorganic particles, resulting in an effect of further improving the removal rate.

17 Claims, 8 Drawing Sheets

(52) U.S. Cl.
CPC ...... *C01P 2004/50* (2013.01); *C01P 2004/64* (2013.01); *C01P 2006/22* (2013.01); *C01P 2006/40* (2013.01)

(56) References Cited

U.S. PATENT DOCUMENTS

| | | | | |
|---|---|---|---|---|
| 7,965,057 | B2 | 6/2011 | Burzanowska et al. | |
| 12,269,983 | B2 * | 4/2025 | Nam | C01F 17/235 |
| 2006/0032150 | A1 | 2/2006 | So et al. | |
| 2017/0283673 | A1 * | 10/2017 | Zhou | H01L 21/463 |
| 2017/0298252 | A1 * | 10/2017 | Arnepalli | C09K 3/1436 |
| 2021/0017422 | A1 * | 1/2021 | Iwano | C09K 3/1463 |
| 2022/0235252 | A1 | 7/2022 | Nam et al. | |

FOREIGN PATENT DOCUMENTS

| | | | |
|---|---|---|---|
| JP | S64-052610 | A | 2/1989 |
| JP | 2009-269104 | A | 11/2009 |
| JP | 2022-534203 | A | 7/2022 |
| KR | 10-2006-0015851 | A1 | 2/2006 |
| KR | 10-1406757 | B1 | 6/2014 |
| KR | 10-2015-0017909 | A | 2/2015 |
| KR | 10-2019-0063989 | A | 6/2019 |
| KR | 10-2019-0139568 | A | 12/2019 |
| KR | 10-2020-0082046 | A1 | 7/2020 |
| WO | 2021-172954 | A2 | 9/2021 |

OTHER PUBLICATIONS

Wu et al., "Oxidation state and lattice expansion of CeO2-x nanoparticles as a function of particle size", Physical Review, vol. 69 No. 125415, p. 1-9, (2004).
Office Action from corresponding Korean Patent Application No. 10-2021-0061195 dated May 19, 2025. (Google Translation).
Search Report from corresponding European Patent Application No. 228078564 dated Mar. 21, 2025.
Office Action from corresponding Korean Patent Application No. 10-2021-0061195 dated Jan. 5, 2024.
Izu et al., "Controlled Synthesis of Monodispersed Cerium Oxide Nanoparticle Sols Applicable to Preparing Ordered Self-Assemblies", Bulletin of the Chemical Society of Japan. vol. 81, No. 6, p. 761-766 (2008).
Office Action from corresponding Japanese Patent Application No. 2023-570008 dated Jan. 7, 2025. (Google Translation).
Office Action from corresponding Korean Patent Application No. 10-2021-0061195 dated Nov. 7, 2024. (Google Translation).
Brand et al., "Correlation between hydroxyl fraction and O/Al atomic ratio as determined from XPS spectra of aluminium oxide layers", Surface and Interface Analysis, vol. 36, p. 81-88, (2004).
Iulianelli et al., "Influence of TiO2 nanoparticle on the thermal, morphological and molecular characteristics of PHB matrix", Polymer Testing, vol. 65, p. 156-162, (2018).
Kim et al., "A Novel CMP (Chemical Mechanical Planarization) Abrasive of Nanocluster colloidal ceria; SurfaceTopology, Crystallinity, activity, and Oxide Removal rate", Kiche Spring Meeting, p. 351, (2021). (Abstract Only).
Monshi et al., "Modified Scherrer Equation to Estimate More Accurately Nano-Crystallite Size Using XRD", World Journal of Nano Science and Engineering, vol. 2, p. 154-160, (2012).
Tang et al., "Surface Patterning with SiO2@PNiPAm Core—Shell Particles", ACS Omega, vol. 3, p. 12089-12098, (2018).
Thromat et al., "Formation of the Ce/Y203 interface: an in situ XPS study", Surface Science, vol. 345, p. 290-302, (1996).
Zhang et al., "Visible-light induced oxo-bridged ZrIVOCeIII redox centre in tetragonal ZrO2—CeO2 solid solution for degradation of organic pollutants", Physical Chemistry Chemical Physics , vol. 13, p. 3896-3905, (2011).
International Search Report from corresponding Patent Application No. PCT/KR2022/006798 dated Sep. 1, 2022.
Office Action from corresponding Korean Patent Application No. 10-2021-0061195 dated Jun. 5, 2023. (Google translation).
Office Action from corresponding Japanese Patent Application No. 2023-570008 dated Jul. 1, 2025. (Google Translation).

* cited by examiner

AQUEOUS DISPERSION COMPRISING INORGANIC PARTICLES

CROSS REFERENCE TO RELATED APPLICATIONS

The present application is a National Stage filing of PCT Application No. PCT/KR2022/006798 filed May 12, 2022, entitled "Aqueous Dispersion Comprising Inorganic Particles", which claims the benefit of priority based on Korean Patent Application No. 10-2021-0061195 filed on May 12, 2021.

TECHNICAL FIELD

The present disclosure relates to an aqueous dispersion of ceria-based particles suitable as a polishing slurry used in semiconductor device manufacturing, and the like, and more particularly, to an aqueous dispersion of ceria-based fine particles suitable for flattening a polished film formed on a substrate by chemical mechanical polishing (CMP).

BACKGROUND ART

High performance is being realized by increasing the density and miniaturization of semiconductor devices such as semiconductor substrates and wiring boards. In this semiconductor manufacturing process, so-called chemical mechanical polishing (CMP) is applied, and specifically, it is an essential technology for shallow trench element separation, planarization of interlayer insulating films, and formation of contact plugs and Cu damascene wiring.

In general, polishing slurry for CMP includes polishing particles and chemical components, and the chemical components play a role in promoting polishing by oxidizing or corroding a target film. On the other hand, the polishing particles have the role of polishing by a mechanical action, and colloidal silica, fumed silica, and ceria ($CeO_2$) particles are used as polishing particles. In particular, the ceria particles are applied to polishing in a process for shallow trench device separation because they exhibit a particularly high polishing speed for silicon oxide films.

In the process for shallow trench device separation, polishing of a silicon nitride film is performed as well as polishing of the silicon oxide film. In order to facilitate device separation, it is desirable for the silicon oxide film to have a high polishing speed and the silicon nitride film to have a low polishing speed, so the polishing speed ratio (selectivity ratio) is also important.

In addition, inorganic particles are used as raw materials or final products in various fields, and are especially utilized in a wide range of fields such as chemical catalysts, biotechnology, semiconductor processing, and tempered glass processing.

A process for synthesizing these inorganic particles is very diverse, and synthesis methods are divided into a method of assembling atoms (bottom up) and a method of reducing the size of a large lump (top down) depending on preparation approaches, and are divided into physical, mechanical, and chemical methods depending on synthesis principles. Among chemical methods, the liquid phase reaction method, which uses a chemical reaction in a liquid phase, is the most widely used method for synthesizing ceramic raw material powder. As types of powder preparation processes using liquid chemical reactions, a sol-gel method, pyrolysis method, polymerized complex method, precipitation method, hydrothermal method, etc. are known.

In general, during the synthesis of inorganic particles, the particles grow according to the unique assembly characteristics of the atoms, and the final shape of the inorganic particle is determined accordingly. In other words, since the shape of an inorganic particle is an inherent property of the inorganic particle, it is very difficult to prepare inorganic particles of the same composition into different shapes.

For example, a ceria ($CeO_2$) crystal has the shape of a fluorite particle with an angled hexagonal structure. When ceria particles are used as polishing particles in the slurry used in a CMP process during the semiconductor manufacturing process, scratch defects occur due to the angled structure of the ceria particles. Therefore, to solve this problem, methods for preparing ceria particles in spherical shapes are being studied. However, it is very difficult to synthesize ceria particles that are uniform in size and well dispersed while changing the shape of the angled fluorite structure ceria into a spherical shape.

Additionally, as the shape of the inorganic particle changes, the specific surface area of the particle tends to vary, and the degree of chemical reaction on the particle surface may also vary accordingly. For example, when using inorganic particles as a catalyst, the specific surface area of the particle is directly related to the catalytic active site, and particles with a larger specific surface area compared to the same volume have superior reactivity.

Another issue with inorganic particles is dispersion stability. Nano-sized inorganic particles (hereinafter, also referred to as 'nanoparticles') are generally thermodynamically unstable in aqueous solutions and have difficulty of not dispersing stably due to their high specific surface area. Therefore, there is a problem in that the particles may agglomerate during a storage process, which may result in changes in shape or properties. Therefore, a method for improving dispersibility of nanoparticles is required.

Accordingly, a technology to control the surface charge of nanoparticles is needed to improve the dispersibility of the nanoparticles. In particular, for example, dispersion of ceria or silica nanoparticles used as polishing particles in a slurry in an aqueous solution in a semiconductor CMP process is very important. Therefore, there are efforts to improve the efficiency of the polishing process by adjusting pH of the aqueous slurry solution to provide an environment that can generate stronger attraction between the polishing particles and a film material.

DISCLOSURE OF THE INVENTION

Technical Goals

An object to be achieved by the present disclosure is to provide an aqueous dispersion containing inorganic particles that have a spherical shape rather than an angular shape and have excellent water dispersibility, especially excellent polishing ability for a silicon film and at the same time, low scratch damage.

Technical Solutions

In order to achieve the above object, the present disclosure provides an aqueous dispersion including inorganic particles formed by agglomeration of a plurality of elementary particles, wherein the elementary particle has a mixed phase of a crystalline phase and an amorphous phase and has a crystallinity of 90% or less.

According to an embodiment, the aqueous dispersion may further include an amino acid.

According to an embodiment, based on a total weight of the aqueous dispersion, a content of the amino acid may be 0.01 to 5% by weight, and a content of the inorganic particles may be 0.01 to 5% by weight.

According to an embodiment, a weight ratio of the inorganic particles and the amino acid may be 100:50 to 200.

According to an embodiment, the amino acid may be one or more selected from tyrosine, phenylalanine, and tryptophan.

According to an embodiment, the elementary particles may have a particle diameter of 1 to 50 nm.

According to an embodiment, the inorganic particles may have a density of 3.0 to 5.0 g/ml, an average particle diameter of 30 to 1000 nm, and a standard deviation of the particle diameter of 20 or less.

According to an embodiment, the inorganic particles may have an isoelectric point of pH 5 to 7, and pH of the aqueous dispersion may be 3 to 7.

According to an embodiment, the inorganic particles may have a surface charge of +30 to +50 mV or −30 to −50 mV of zeta potential in an aqueous dispersion state of pH 4.

According to an embodiment, the inorganic particles may be formed of oxides of one or more elements selected from a group consisting of Ga, Sn, As, Sb, Ce, Si, Al, Co, Fe, Li, Mn, Ba, Ti, Sr, V, Zn, La, Hf, Ni, and Zr.

According to an embodiment, the inorganic particles may be $CeO_2$ particles, and a $Ce^{3+}/Ce^{4+}$ ion ratio may be 5 to 60.

According to an embodiment, the aqueous dispersion may be used as a slurry for CMP.

According to an embodiment, the inorganic particle may be prepared by a method including:

(a) dissolving a self-assembling surfactant in water or a mixed solvent of water and a solvent compatible with water;

(b) preparing an inorganic precursor solution by dissolving or dispersing an inorganic precursor in the solvent before, after, or simultaneously with step (a); and (c) forming elementary particles having a mixed phase of a crystalline phase and an amorphous phase in a shell formed by the surfactant through a self-assembly reaction of the inorganic precursor and the surfactant, and forming an inorganic particle by aggregation of a plurality of the elementary particles.

According to an embodiment, the inorganic particles included in the aqueous dispersion may be inorganic particles of which surface charge is controlled by further comprising treating the inorganic particles obtained in step (c) with an acid and a base.

According to an embodiment, the self-assembling surfactant is one or more selected from cationic surfactants, anionic surfactants, and amphoteric surfactants having a charge capable of binding to the inorganic precursor, and has a functional group capable of condensation reaction or crosslinking reaction.

According to an embodiment, the functional group capable of condensation reaction or crosslinking reaction may be one or more selected from a group consisting of an amide group, a nitro group, an aldehyde group, and a carbonyl group.

According to an embodiment, the self-assembling surfactant may be a polymer of structure of Formula 1 below.

[Formula 1]

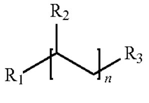

In Formula 1, $R_1$ and $R_3$ are independently hydrogen atoms, $C_1$-$C_{10}$ alkyl groups, or alkoxy groups, $R_2$ is a substituent of Formula 2 below, and n is a number of 2 or more.

[Formula 2]

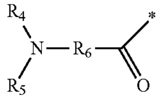

In Formula 2, $R_4$ and $R_5$ are independently hydrogen atoms, $C_1$-$C_{10}$ alkyl groups, or alkoxy groups, $R_6$ is a $C_1$-$C_{10}$ alkylene group or a single covalent bond, and * represents a connection site.

In addition, according to another aspect of the present disclosure, there is provided an inorganic particle formed by agglomeration of a plurality of elementary particles having a mixed phase of a crystalline phase and an amorphous phase, which satisfies one or more of (i) to (v) below.

(i) The elementary particles have a crystallinity of 90% or less;

(ii) An aspect ratio (minor axis/major axis) of the inorganic particle is 0.8 or more;

(iii) A particle diameter of the elementary particle is 20 nm or less;

(iv) A standard deviation of a particle diameter of the inorganic particle is 20 nm or less;

(v) The inorganic particle is $CeO_2$ particle, and a $Ce^{3+}/Ce^{4+}$ ion ratio is 40 or more.

Advantageous Effects

A dispersion according to the present disclosure uses inorganic particles formed by agglomeration of a plurality of elementary particles having a mixed phase of a crystalline phase and an amorphous phase and a crystallinity of 90% or less, and the inorganic particles have a shape with surface protrusions formed by the elementary particles, which allows them to have a large specific surface area, and facilitating control of the surface charge by adjusting pH. As a result, the contact area with the silicon film is increased, the polishing speed is improved, and scratch damage is low, resulting in excellent polishing efficiency when used as polishing particles included in a CMP polishing slurry. In addition, when an aqueous dispersion according to the present disclosure further includes amino acids and is used as a CMP polishing slurry, amino acids are adsorbed on the surface of a silicon oxide wafer, which has the effect of further improving a removal rate by strengthening electrical attraction between the silicon oxide wafer and the inorganic particles.

BEST MODE FOR CARRYING OUT THE INVENTION

Hereinafter, the present disclosure will be described in detail with reference to various embodiments.

However, this is not intended to limit the present disclosure to a specific embodiment, and should be understood to include all modifications, equivalents, or substitutes included in the spirit and scope of the present disclosure.

Terms such as first, second, A, B, etc., may be used to describe various components, but the components are not limited by the terms and are used only for the purpose of distinguishing one component from another.

The term "and/or" includes any one or an inclusive combination of a plurality of items described.

When it is mentioned that a component is "connected" or "accessed" to another component, it should be understood that the component may be directly connected or accessed to the other component, or that another component may exist therebetween.

Singular expressions include plural expressions unless otherwise specified.

Terms such as "comprising," "including" or "having" refer to the presence of features, values, steps, operations, components, parts, or combinations thereof described in the specification, and do not exclude the possibility that other features, values, steps, operations, components, parts, or combinations thereof not mentioned may exist or be added.

According to the present disclosure, it is possible to synthesize inorganic particles having a shape other than the particle shape according to inherent atomic assembly characteristics of an inorganic material by reacting a self-assembling surfactant with an inorganic precursor in an aqueous solvent. For example, according to the inherent atomic assembly structure, ceria ($CeO_2$) inorganic particles, which are inevitably formed into an angular fluorite hexagonal structure, may be prepared into spherical particles with protrusions.

According to the present disclosure, a plurality of elementary particles in which a crystalline phase and an amorphous phase are mixed and with a crystallinity of 90% or less are aggregated to form inorganic particles. The crystallinity is also the crystallinity of the elementary particles, but since the elementary particles are aggregated to form inorganic particles in the form of nanoclusters, it may also be referred to as a crystallinity of inorganic particles. The crystallinity also means the proportion of the crystalline phase of the total phases. In other words, a crystallinity of 90% or less means that the crystalline phase accounts for 90% or less and the amorphous phase accounts for 10% or more. The crystallinity of the elementary particles or inorganic particles may be 90% or less, 85% or less, 80% or less, or 75% or less, and may be 50% or more, 60% or more, 65% or more, or 70% or more.

Since the crystalline phase and the amorphous phase are mixed at a certain ratio, the occurrence of defects such as scratches and dishing on a substrate may be minimized when used as a polishing slurry in the CMP process.

Figure 1:
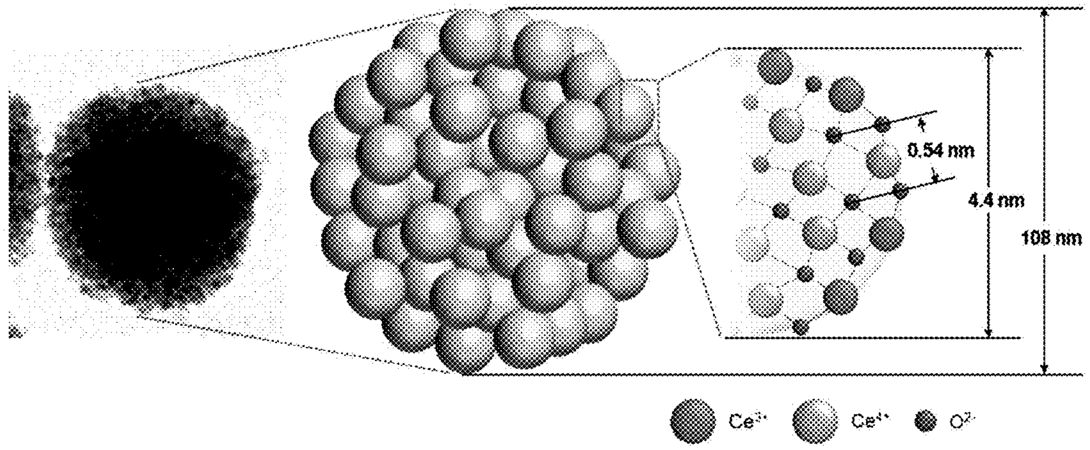
FIG. 1 schematically illustrates a shape of an inorganic particle according to the present disclosure.

FIG. 1 schematically illustrates a structure of an inorganic particle according to the present disclosure. In other words, the inorganic particle according to the present disclosure is formed of an aggregate of very small elementary particles, and has a very unique surface because the elementary particles have a mixed phase of a crystalline phase and an amorphous phase and form surface protrusions.

As shown in FIG. 1, both the inorganic particles and elementary particles are substantially spherical. Here, spherical means that the aspect ratio expressed as the ratio of minor axis/major axis is 0.8 or more, 0.9 or more, or 0.95 or more, and its reciprocal is 1.2 or less, 1.1 or less, or 1.05 or less. Therefore, when referring to the inorganic particles according to the present disclosure, hereinafter, they are also referred to as "spherical protruding inorganic particles" or "spherical protruding particles."

By having spherical protrusions on the surface of the inorganic particle, there is an effect of increasing the specific surface area of the particle based on the same mass. The diameter of elementary particles forming spherical protrusions is 2 to 25% of the inorganic particle diameter. The particle diameter of elementary particles may be 50 nm or less, 40 nm or less, 30 nm or less, 20 nm or less, 10 nm or less, 8 nm or less, 6 nm or less, or 5 nm or less, and 1 nm or more, 2 nm or more, 3 nm or more, or 4 nm or more. It is preferable that the particle diameter of the elementary particles is 20 nm or less.

The spherical protruding inorganic particles used in the aqueous dispersion according to the present disclosure have a particle size distribution of 30 to 1000 nm and are formed in a uniform size. The size of the spherical protruding inorganic particles is based on the number average particle diameter, and is preferably 50 nm or more, 100 nm or more, 110 nm or more, or 120 nm or more and 800 nm or less, 500 nm or less, 300 nm or less, 200 nm or less, or 150 nm or less. The standard deviation of the inorganic particle particle diameter may be 20 nm or less, 18 nm or less, 16 nm or less, 14 nm or less, 12 nm or less, or 11 nm or less.

FIG. 1 schematically shows the structure of ceria particles prepared according to Preparation Example 1 of the present disclosure, and shows that $CeO_2$ units (size 0.54 nm) gather to form elementary particles (particle diameter 4.4 nm), and the elementary particles gather to form ceria particles (particle diameter 108 nm).

The spherical protruding inorganic particles used in the aqueous dispersion according to the present disclosure may be prepared through a self-assembly reaction of a self-assembling surfactant and an inorganic precursor, and as a result, the inorganic particles according to the present disclosure have a density of 3.0 to 5.0 g/ml. Density may be measured by TAP densitometry (ASTM B527). The density of the inorganic particles may be 3.2 g/ml or more, 3.3 g/ml or more, 3.4 g/ml or more, or 3.5 g/ml or more, and may be 4.5 g/ml or less or 4.0 g/ml or less.

According to an embodiment, the primary particles and secondary particles may each independently consist of oxides of one or more elements selected from the group consisting of Ga, Sn, As, Sb, Ce, Si, Al, Co, Fe, Li, Mn, Ba, Ti, Sr, V, Zn, La, Hf, Ni and Zr. According to a preferred embodiment, it may be one or more oxides selected from cerium (Ce), silicon (Si), and aluminum (Al). According to a preferred embodiment, the inorganic particles may consist of ceria ($CeO_2$).

According to an embodiment, the spherical protruding inorganic particles may have a surface charge of +30 mV or more or −30 mV or less at least once in an aqueous dispersion state, and in particular, exhibit a high absolute surface charge (zeta potential) of +30 to +50 mV or −30 to −50 mV under pH4 conditions. Here, the term ‘surface charge’ is used interchangeably with ‘zeta potential’.

Additionally, the isoelectric point of the inorganic particles may be pH 5 to 7. Preferably, the isoelectric point may be pH 5.5 or more and 6.5 or less. In an aqueous system, a lower isoelectric point means that there are more OH groups on the particle surface, which means that there are more active sites on the particle surface, which is advantageous in improving polishing performance in the CMP process.

When the inorganic particles according to the present disclosure are used as polishing particles in a slurry in a semiconductor CMP process, scratch defects can be compensated because they are spherical without sharp angles and contain an amorphous phase, and the numerous protrusions on the surface of the particle increase the specific surface area, which not only increases the probability of contact with the film to be polished, but also improves the polishing speed due to changes in the surface properties of the particle. For example, in the case of spherical protruding ceria particles prepared by the method proposed in the present disclosure, Ce(III) increases compared to existing hexagonal fluorite ceria particles due to elemental defects on the particle surface, thereby improving the polishing speed.

The ceria particles prepared according to the present disclosure may have a $Ce^{3+}/Ce^{4+}$ ion ratio of 5 to 60. The higher the $Ce^{3+}/Ce^{4+}$ ion ratio, the higher the polishing speed, and according to the present disclosure, an ion ratio of 5 or more, 10 or more, 20 or more, 30 or more, 40 or more, 42 or more, 44 or more, or 46 or more may be obtained, and is preferably 40 or more. The ion ratio may be 60 or less, 55 or less, or 50 or less.

In addition, by using the method of controlling the surface charge of inorganic particles through pH control proposed in the present disclosure, the surface charge of spherical protruding inorganic particles may be more easily controlled, and by using this to create an aqueous solution pH environment that may achieve optimal interaction between the polishing particles and the film material in the CMP process, more efficient and stable polishing is possible.

Hereinafter, a method for preparing spherical protruding inorganic particles using a liquid phase synthesis method will be described in more detail.

Method for Preparing Spherical Protruding Inorganic Particles Using a Liquid Phase Synthesis Method The spherical protruding inorganic particles according to the present disclosure may be prepared by a method including the following steps.

(a) dissolving a self-assembling surfactant in a solvent;

(b) preparing an inorganic precursor solution by dissolving or dispersing an inorganic precursor in the solvent before, after, or simultaneously with step (a); and (c) forming elementary particles having a mixed phase of a crystalline phase and an amorphous phase in a shell formed by the surfactant through a self-assembly reaction of the inorganic precursor and the surfactant, and forming inorganic particles by aggregation of a plurality of the elementary particles.

In the process of preparing spherical protruding inorganic particles using the liquid-phase synthesis method proposed in the present disclosure the particle formation process of step (c) includes (i) a step in which elementary particles are formed as the inorganic precursor is reduced with a self-assembling surfactant; and (ii) a step in which a plurality of elementary particles aggregate and grow into spherical inorganic particles with protrusions on the surface as the self-assembly reaction of the self-assembling surfactant progresses. Although the two steps of inorganic particle formation and surface protrusion formation are explained separately, since the reactions occur continuously, it may be seen that spherical protruding inorganic particles are formed through one synthesis step.

Inorganic Precursor

First, a precursor solution of the inorganic material to be prepared is prepared. It is prepared by mixing an inorganic precursor, a self-assembling surfactant, and a solvent, and at this time, the surfactant may first be dissolved in the solvent and then the inorganic precursor may be added, the inorganic precursor may first be dissolved in the solvent and then mixed with the surfactant, or the inorganic precursor and the self-assembling surfactant may be simultaneously added to the solvent and mixed. In this process, a weak bond is formed between the inorganic precursor and the surfactant.

Here, the inorganic precursor includes one or more elements selected from the group consisting of Ga, Sn, As, Sb, Ce, Si, Al, Co, Fe, Li, Mn, Ba, Ti, Sr, V, Zn, La, Hf, Ni and Zr, and is a material capable of forming an oxide. The inorganic precursor used in the present disclosure is preferably in the form of a compound capable of ionic bonding with a charged surfactant in an aqueous solution. For example, it may be may be a nitrate, bromide, carbonate, chloride, fluoride, hydroxide, iodide, oxalate or sulfate, which may be in hydrated or anhydrous form.

More specifically, for example, salts containing cerium, such as ammonium cerium(IV) nitrate, cerium(III) bromide anhydrous, cerium(III) carbonate hydrate, cerium(III) chloride anhydrous, cerium(III) chloride heptahydrate, cerium (III) fluoride anhydrous, cerium(IV) fluoride, cerium(IV) hydroxide, cerium(III) iodide anhydrous, cerium(III) nitrate hexahydrate, cerium(III) oxalate hydrate, cerium(III) sulfate, cerium(III) sulfate hydrate, cerium(III) sulfate octahydrate, cerium(IV) sulfate hydrate may be used.

As another example, silicone precursors such as tetraethyl orthosilicate (TEOS), diethoxydimethylsilane (DEMS) and vinyltriethoxysilane (VTES), titanium precursors with the $Ti(OR)_4$ structure, zirconium precursors with the $Zr(OR)_4$ structure, aluminum precursors with the $Al(OR)_4$ structure, etc., may be used. Here, R refers to a functional group that may be hydrated or alcoholized with water or alcohol, and may be, for example, a lower alkyl group such as a methyl group or an ethyl group. In addition, it is also possible to use a precursor that may form oxides of Ga, Sn, As, Sb, Mn, or V.

Self-Assembling Surfactant

Surfactants that form self-assembly may include anionic, cationic, and amphoteric surfactants, and may possess a functional group that may combine with an inorganic precursor, dissolve in a solvent, have a (+) or (−) charge, or both, and may induce a particle formation reaction through a cross-linking reaction. Examples of such functional groups include amide group, nitro group, aldehyde group, carbonyl group, etc.

According to the present disclosure, particles with different surface charges may be prepared depending on the type of self-assembling surfactant used in the synthesis reaction. In other words, the self-assembling surfactant may be selectively used depending on the surface charge of the inorganic particles to be synthesized and prepared. For example, when it is to prepare spherical protruding inorganic particles with a (−) charge, a cationic surfactant may be used. The (+) charged part of the cationic surfactant combines with the ion of the inorganic precursor to form elementary particles, and as the reaction progresses, a self-assembling shell is formed, and the inorganic particles within it grow into a spherical shape with protrusions on the surface. According to the same principle, when it is to prepare spherical protruding inorganic particles with an opposite (+) charge, an anionic surfactant may be used. As such, in order to prepare inorganic particles with the target surface charge, a surfactant shell with specific ionic properties is required, and it is possible to prepare particles with different surface charges depending on the type of self-assembling surfactant used.

In addition, if necessary, one or more surfactants may be mixed and used during the synthesis process. Among self-assembling materials, surfactants may form crosslinks while dissolving in a solvent, and self-assemble as the reaction progresses at a certain temperature and over a certain time. At this time, the gap between the elementary particles bound to the surfactant becomes closer and the particles grow as they aggregate, and inorganic particles are formed into solid spherical particles as they grow surrounded by a shell of self-assembled surfactant, and at the same time grow into a shape containing numerous protrusions on the surface. Protrusions may grow simultaneously on the surface of a spherical particle, or independently grown protrusions may appear on the surface of a spherical particle to form a protrusion.

As anionic surfactants, alkylbenzene sulfonates, alkyl sulfates, alkyl ether sulfates, soaps, and the like may be used.

As cationic surfactants, alkyl quaternary nitrogen compounds and quaternary ammonium compounds such as esterquats and the like may be used.

In addition, an amphoteric surfactant containing both a cationic quaternary ammonium ion group and an anionic carboxylate ($—COO^-$)

$$\text{sulfate}(-SO_4^{2-})$$

group may be used.

In addition, picolinic acid, (carboxymethyl)dimethyl-3-[(1-oxododecyl)amino]propylammonium hydroxide, lauryl betaine, betaine citrate, sodium lauroamphoacetate, sodium hydroxymethylglycinate, (carboxymethyl)dimethyloleylammonium hydroxide, cocamidopropyl betaine, (carboxylate methyl)dimethyl(octadecyl)ammonium, PEO-PPO block copolymer, anionic siloxanes and dendrimers, poly(sodium 10-undecylenate), poly(sodium 10-undecenylsulfate), poly (sodium undeconylvalinate), polyvinylpyrrolidone, polyvinylalcohol, 2-acrylamide-2-methyl-1-propanesulfonic acid, alkyl methacrylamide, alkyl acrylate, poly(allylamine)-supported phases, poly(ethyleneimine), poly(N-isopropylacrylamide), n-hydroxysuccinimide, and the like may be used.

Preferably, the self-assembling surfactant may be a polymer of the following Formula 1. In addition, the polymer of Formula 1 below may be said to be an amphoteric surfactant that has both (+) and (−) properties within the molecule.

[Formula 1]

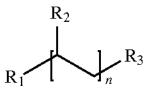

In Formula 1, $R_1$ and $R_3$ are independently hydrogen atoms, $C_1$-$C_{10}$ alkyl groups, or alkoxy groups, n is a number of 2 or more, and $R_2$ is a substituent of Formula 2 below.

[Formula 2]

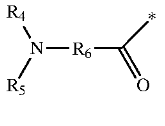

In Formula 2, $R_4$ and $R_5$ are independently hydrogen atoms, $C_1$-$C_{10}$ alkyl groups, or alkoxy groups, $R_6$ is a $C_1$-$C_{10}$ alkylene group or a single covalent bond, and * represents a connection site.

The polymer of Formula 1 preferably has a molecular weight of 500 or more and 100,000 g/mol or less. Here, the molecular weight is the weight average molecular weight, and the weight average molecular weight means the polystyrene conversion molecular weight measured by GPC method. The molecular weight may be 1000 or more, 5000 or more, 10,000 or more, 20,000 or more, or 30,000 or more, and may be 95,000 or less, 90,000 or less, 85,000 or less, 80,000 or less, 70,000 or less, 60,000 or less, 50,000 or less, or 40,000 or less.

The amount of self-assembling surfactant used may be 30 to 150 parts by weight per 100 parts by weight of the inorganic precursor. The amount of surfactant used may be 40 parts by weight or more, 50 parts by weight or more, 60 parts by weight or more, 70 parts by weight or more, 80 parts by weight or more, or 90 parts by weight or more, per 100 parts by weight of the inorganic precursor, and 140 parts by weight or less, 130 parts by weight or less, 120 parts by weight or less, or 110 parts by weight or less.

Solvent

The solvent used in the synthesis reaction of the spherical protruding inorganic particles may be water or a mixed solvent of a solvent compatible with water and water.

According to an embodiment, the solvent compatible with water may be one or more selected from alcohol, chloroform, ethylene glycol, propylene glycol, diethylene glycol, glycerol, and butyl glycol.

When a solvent compatible with water is used by being mixed with water, the mixing volume ratio of water:compatible solvent may be 100:50-200, 100:60-150, or 100:70-120.

When using water or a mixture of water and a solvent compatible with water as a solvent to add and dissolve inorganic precursors and/or self-assembling surfactants, it is best to use a stirrer and proceed with the reaction after complete dissolution. Otherwise, it may interfere with the formation of particles with uniform morphology.

Spherical Protruding Inorganic Particle Synthesis Reaction

In the spherical protruding inorganic particle synthesis step, the previously prepared inorganic precursor solution is introduced into the reactor and a synthesis reaction with the self-assembling surfactant is performed. Synthesis of spherical protruding inorganic particles is carried out at a temperature range of 60 to 250° C. for 1 to 24 hours. Preferably, it may be carried out for 2 hours or more, 3 hours or more, or 4 hours or more, and 20 hours or less, 10 hours or less, or 8 hours or less, and in the range of 70° C. or higher, 80° C. or higher, or 90° C. or lower, and 220° C. or lower, 200° ° C. or lower, 180° C. or lower, or 160° C. or lower.

Self-assembling surfactants are dissolved in a solvent and then combine with the ions of the inorganic precursor as the reaction proceeds at a certain temperature and time. Here, self-assembly means spontaneously forming an organized structure or form by combining the part with (+) properties of the surfactant with the part with (−) properties. For example, if a surfactant has an amide group in its molecular structure, the nitrogen atom part has (+) properties and the oxygen atom part has (−) properties, so that they may form a network structure by themselves. At the same time, the distance between the elementary particles dissolved in the solvent with these self-assembling materials becomes closer and the particles grow as they aggregate (nanocluster formation). In this process, the particles grow surrounded by a surfactant shell, forming spherical particles, and protrusions are formed on the surface of the particles. At this time, protrusions may grow simultaneously on the surface of the spherical particle, or independently grown protrusions may be exposed on the surface of the spherical particle to form protrusions.

Method for Controlling Surface Charge of Spherical Protruding Inorganic Particles According to the present disclosure, the surface charge of the inorganic particles obtained from the above synthesis reaction may be controlled by treating the inorganic particles with an acid and/or a base.

The method for controlling the surface charge of spherical protruding inorganic particles proposed in the present disclosure is basically controlling the pH of the aqueous dispersion containing the particles. For example, when there are positively charged particles in an aqueous dispersion, as more acidic substances are added, the particles will have a stronger positive charge, and conversely, as more basic substances are added, the surface charge of the particle will gradually become slightly positive and then reach a point where it becomes neutral. If more base is added continuously, it will become negatively charged. Using this principle, the surface charge of inorganic particles may be controlled by adjusting the pH in the aqueous solution.

As an acidic pH adjuster to lower the pH of an aqueous solution, one or more acidic substances such as phosphoric acid, hydrochloric acid, nitric acid, and sulfuric acid may be used in combination, and on the other hand, as a basic pH adjuster to increase pH, one or more basic substances such as sodium hydroxide and ammonia water may be used in combination. At this time, accurate pH measurement may be achieved only by adjusting the pH and evenly mixing the inside of the aqueous solution using a stirrer at the same time.

The spherical protruding inorganic particles according to the present disclosure are inorganic particles having a surface charge of +30 mV or more or −30 mV or less at least once, and a surface charge control method that can more effectively express surface properties by existing in a stable state in an aqueous solution is included. The particles prepared in this way have excellent bonding power with various media such as glass and silicon, so they may be used as polishing particles.

In particular, the inorganic particles according to the present disclosure may have a surface charge of +30 to +50 mV or −30 to −50 mV in an aqueous dispersion state of pH 4. In other words, since it has a zeta potential with a high absolute value under given pH conditions, the removal rate may be further improved. Here, the term 'surface charge' is used interchangeably with 'zeta potential'.

According to the present disclosure, an aqueous dispersion is provided wherein the above-described inorganic particles are dispersed in water and contain amino acids as additives.

Metal oxide-based inorganic particles are polished by combining metal elements with the silicon oxide plane. For example, ceria particles are polished through $SiO_2$ planes and Ce—O—Si bonds, and amino acids may increase the removal rate by strengthening the electrical attraction between the $SiO_2$ wafer and ceria particles. In other words, amino acids have the effect of increasing the removal rate by adsorbing onto the $SiO_2$ surface without directly reacting with ceria.

Specific examples of amino acid may include glycine, α-alanine, β-alanine, N-methylglycine, N,N-dimethylglycine, 2-Aminobutyric acid, norvaline, valine, leucine, norleucine, isoleucine, phenylalanine, proline, sarcosine, ornithine, lysine, taurine, serine, threonine, homoserine, tyrosine, bicine, tricine, 3,5-diiodo-tyrosine, β-(3,4-dihydroxyphenyl)-alanine, thyroxine, 4-hydroxy-proline, cysteine, methionine, ethionine, lathionine, cystathionine, cystine, cysteic acid, aspartic acid, glutamic acid, S-(carboxymethyl)-cysteine, 4-aminobutyric acid, asparagine, glutamine, azaserine, arginine, canavanine, citrulline, δ-hydroxy-lysine, creatine, histidine, 1-methyl-histidine, 3-methyl-histidine, tryptophan, etc.

Among these, aromatic amino acids such as tyrosine, phenylalanine, and tryptophan are more preferable because they have a greater tendency to adsorb to the surface of the silicon oxide wafer without direct reaction with the ceria particles.

In addition, the content of the amino acid may be 0.01 to 5% by weight based on the total weight of the aqueous dispersion. If the amino acid content is less than 0.01% by weight, the effect of increasing the removal rate by adsorbing on the $SiO_2$ surface is minimal, and if it exceeds 5% by weight, a thick passivation layer may be formed on the $SiO_2$ surface, which is not desirable. The content of amino acids may be, for example, based on the total weight of the dispersion, 0.05% by weight or more, 0.06% by weight or more, 0.07% by weight or more, 0.08% by weight or more, and 4% by weight or less, 3% by weight or less, 2% by weight or less, 1% by weight or less, or 0.5% by weight or less.

In addition, the content of the inorganic particles may be 0.01 to 5% by weight based on the total weight of the aqueous dispersion. Preferably it may be 0.05% by weight or more, 0.06% by weight or more, 0.07% by weight or more, 0.08% by weight or more, and 4% by weight or less, 3% by weight or less, 2% by weight or less, 1% by weight or less, or 0.5% by weight or less. If it is less than 0.01% by weight, the polishing effect on the $SiO_2$ wafer surface is minimal, and if it exceeds 5% by weight, the polishing action may be inhibited due to the presence of excessive inorganic particles, which is not desirable.

In addition, by adjusting the weight ratio of amino acids to inorganic particles, an aqueous dispersion with optimal polishing efficiency may be prepared. For example, 50 to 200 parts by weight of amino acids may be used based on 100 parts by weight of inorganic particles. Preferably, it may be 60 or more, 70 or more, 80 or more, 90 or more, 180 or less, 160 or less, 140 or less, or 120 or less based on 100 parts by weight of the inorganic particles. If the amino acid content is less than the above range, the effect of improving polishing efficiency due to the addition of amino acids is minimal, and if it exceeds the above range, a thick amino acid passivation layer may be formed on the $SiO_2$ surface, which may be undesirable.

In addition, according to the research of the present inventors, it was discovered that the removal rate may be further increased when the pH of the aqueous dispersion containing the inorganic particles according to the present disclosure is adjusted to the range of 3 to 7 after adding amino acids. The pH of the aqueous dispersion may be 3 or higher, 3.5 or higher, 4 or higher, or 4.2 or higher, 4.4 or higher, and 7 or lower, 6.5 or lower, 6 or lower, 5.5 or lower, 5 or lower, or 4.9 or lower.

A pH adjuster may be used to adjust the pH of the aqueous dispersion to a desired value. The pH adjuster to be used may be either an acid or an alkali, or may be an inorganic or organic compound. In addition, pH adjusters may be used alone or in combination of two or more types. In addition, when using the above-mentioned various additives having a pH adjusting function (for example, various acids, etc.), the additive may be used as at least a part of the pH adjuster.

In addition, the aqueous dispersion according to the present disclosure may further include various additives depending on its use. For example, when used as a polishing slurry, it may contain various additives that may further improve the polishing speed, such as organic acids, nitrile compounds, and other chelating agents.

Specific examples of organic acids include oxalic acid, malonic acid, succinic acid, glutaric acid, adipic acid, pimelic acid, maleic acid, phthalic acid, malic acid, tartaric acid, and citric acid. Instead of the organic acid, or in combination with the organic acid, salts such as alkali metal salts of the organic acid may be used.

Specific examples of nitrile compounds include acetonitrile, aminoacetonitrile, propionitrile, butyronitrile, isobutyronitrile, benzonitrile, glutarodinitrile, and methoxyacetonitrile.

Specific examples of a chelating agent may include iminodiacetic acid, nitrilotriacetic acid, diethylenetriaminetetraacetic acid, ethylenediaminetetraacetic acid, N,N,N-trimethylenephosphonic acid, Ethylenediamine-N,N,N',N'-tetramethylenesulfonic acid, transcyclohexanediaminetetraacetic acid, 1,2-diaminopropanetetraacetic acid, glycol etherdiaminetetraacetic acid, ethylenediamineorthohydroxyphenylacetic acid, ethylenediaminedisuccinic acid (SS form), N-(2-carboxylate ethyl)-L-aspartic acid, β-alanine diacetic acid, 2-phosphonobutane-1,2,4-tricarboxylic acid, 1-hydroxyethylidene-1,1-diphosphonic acid, N,N'-bis(2-hydroxybenzyl) ethylenediamine-N,N'-diacetic acid, 1,2-dihydroxybenzene-4,6-disulfonic acid, etc.

In addition, the aqueous dispersion according to the present disclosure may contain an oxidizing agent. Available oxidizing agents may include hydrogen peroxide, peracetic acid, perbenzoic acid, tert-butyl hydroperoxide, potassium permanganate, potassium dichromate, potassium iodate, potassium periodate, nitric acid, iron nitrate, perchloric acid, hypochlorous acid, potassium ferricyanide, ammonium persulfate, ozone water, etc. These oxidizing agents may be used individually or in combination of two or more types.

The aqueous dispersion according to the present disclosure may further include other ingredients such as water, abrasives, metal anticorrosives, polishing accelerators, surfactants, oxoacids, preservatives, anti-fungal agents, reducing agents, water-soluble polymers, and organic solvents for dissolving poorly soluble organic substances.

MODES FOR CARRYING OUT THE INVENTION

The configuration and operation of the present disclosure will be described in more detail through the following examples. However, this is presented as a preferred example of the present disclosure and should not be construed as limiting the present disclosure in any way. In addition, descriptions of content that may be sufficiently technically inferred by those skilled in this technical field will be omitted.

Preparation of Spherical Protruding Ceria Particles

Preparation Example 1

To 160 ml of solvent in which ethylene glycol (99%) and water is mixed at a volume ratio of 100:100, 2 g of poly(N-isopropylacrylamide) (Aldrich, Mw: 30,000) as a self-assembling surfactant was added and stirred with a magnetic stirrer. After confirming that it is completely dissolved, as a cerium precursor, 2 g of cerium nitrate hexahydrate ($Ce(NO_3)_3 \cdot 6H_2O$) from Aldrich was added and dissolved to prepare a cerium precursor solution.

The cerium precursor solution was placed in a liquid reactor where the temperature was maintained, and the synthesis reaction was performed for about 165 minutes at a temperature range of 90 to 140° C. After completion of the reaction, the obtained ceria particle solution was centrifuged at 4000 rpm for 1 hour and 30 minutes using a centrifuge, and after separating the precipitate, the washing process with water ($H_2O$) was repeated three times to obtain the resulting ceria particles (hereinafter also referred to as "BOC100").

Preparation Example 2

To an aqueous solution of 2.4 g of cerium chloride dissolved in 180 ml of water, 2.4 g of poly(N-isopropylacrylamide) (Aldrich, Mw: 85,000) which has a different molecular weight than that used in Preparation Example 1, was added and stirred for 6 hours at 70-90° C. to react. Thereafter, by separating and washing in the same manner as in Preparation Example 1 above, the ceria particles having spherical protrusions were obtained.

Reference Example 1

$CeO_2$ particles with a fluorite hexagonal structure (manufacturer: Solvay, product name: HC60) were prepared.

Reference Example 2

To 160 ml of water, 8 g of Aldrich's cerium nitrate hexahydrate ($Ce(NO_3)_3 \cdot 6H_2O$) as a cerium precursor was added and dissolved to create a cerium precursor solution and stirred with a magnetic stirrer. After confirming complete dissolution, 4 g of sodium hydroxide (NaOH) was added to prepare a basic solution. $CeO_2$ particles synthesized by the precipitation method were prepared by stirring for about 1 hour.

Morphological and Structural Analysis

The morphology and structure of the ceria particles of Preparation Examples 1 and 2 and Reference Example 1 were analyzed using a scanning electron microscope (FE-SEM, JEOL JSM 7401F), a high resolution transmission electron microscope (HR-TEM, JEM-2100F), an X-ray diffractometer (Rigaku SmartLab SE X-ray diffractometer with Cu Kα radiation) and an X-ray photoelectron spectrometer (XPS, Thermo ESCALAB 250).

Figure 2:
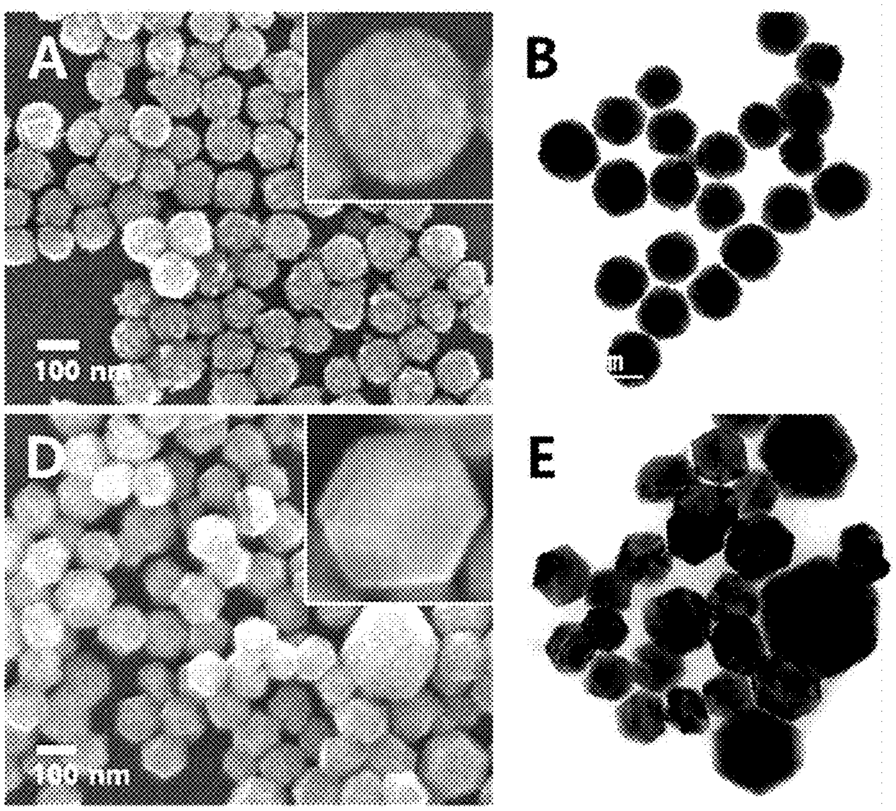
FIG. 2 is a scanning electron microscope image and a high-resolution transmission electron microscope (HR-TEM) image of $CeO_2$ particles according to Preparation Example 1 and Reference Example 1.

A and B of FIG. 2 are SEM images and TEM images showing the shape of ceria particles (BOC100) prepared in Preparation Example 1. It shows that the ceria particles of Preparation Example 1 have a spherical shape with a round and smooth surface.

Meanwhile, according to D and E of FIG. 2, the ceria particle (HC60) of Reference Example 1 shows the characteristic shape of a fluorite crystal with sharply angled edges and a crystal lattice plane.

Figure 3:
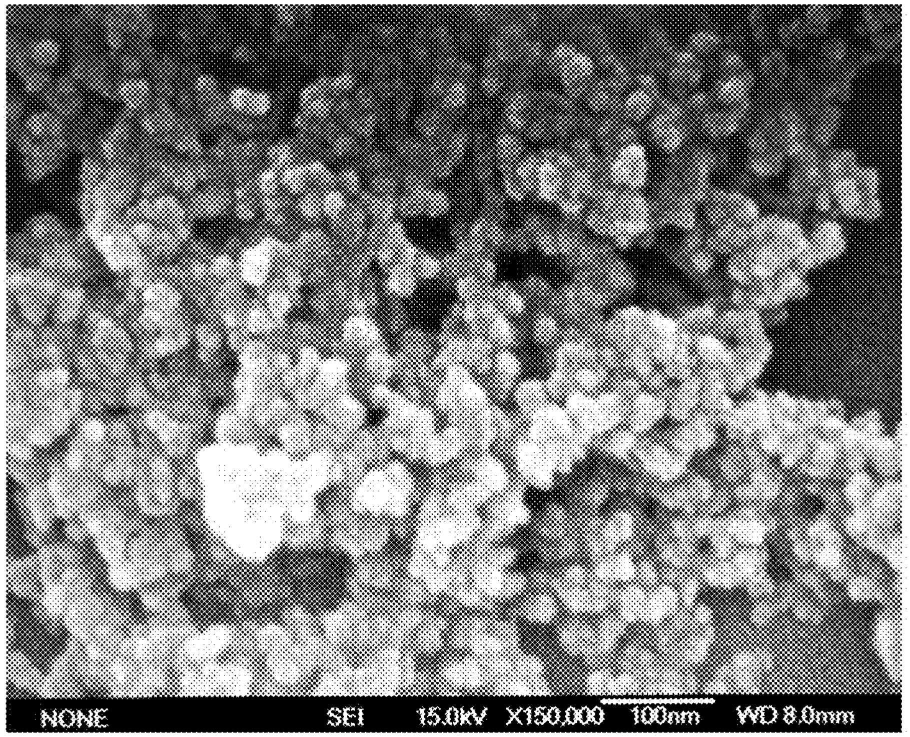
FIG. 3 is a scanning electron microscope image of a sample according to Reference Example 2.

FIG. 3 is an SEM image of particles prepared by precipitation method according to Reference Example 2. It may be seen that the shape of the particles is irregular and clumped together.

Figure 4:
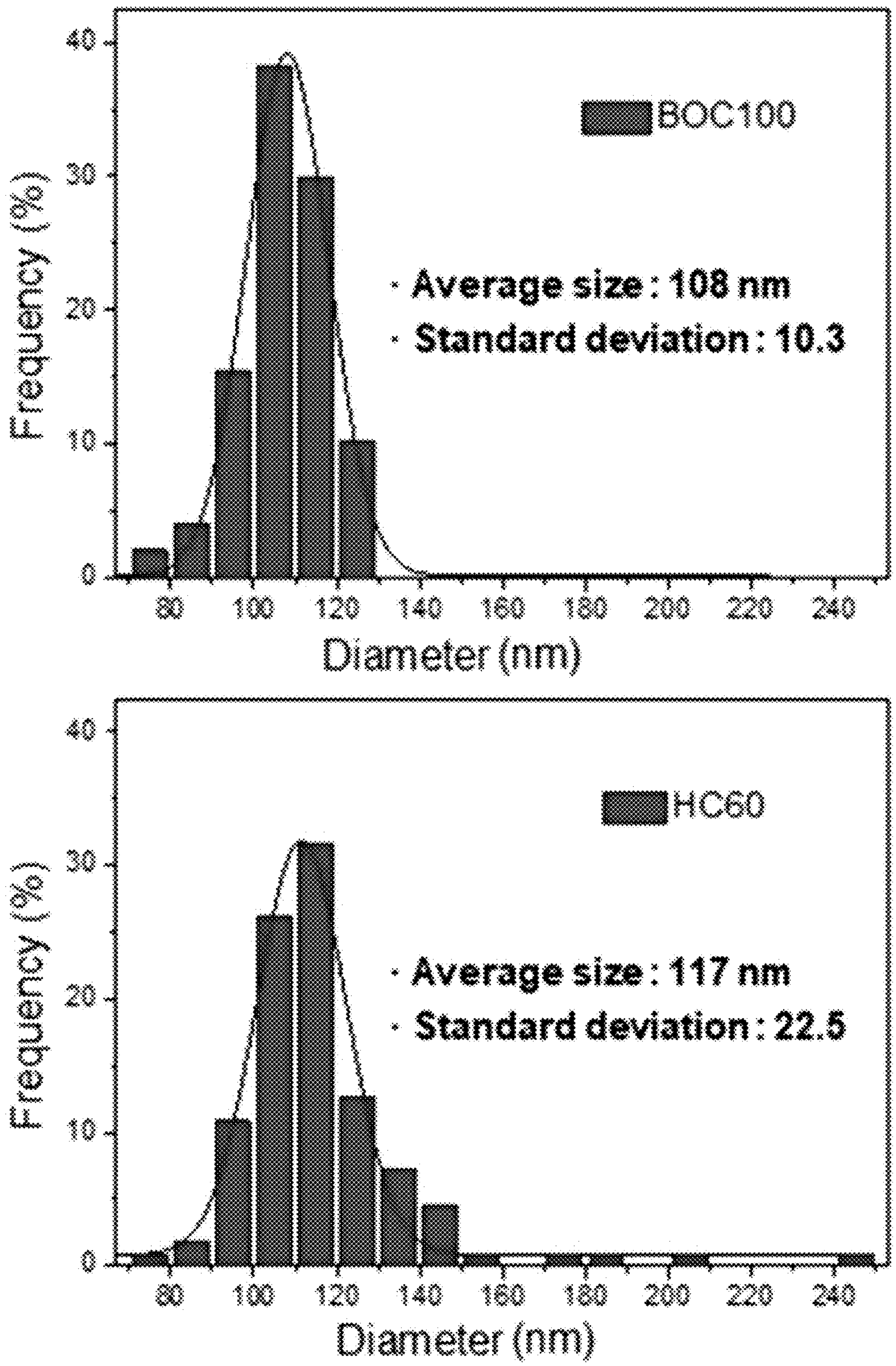
FIG. 4 is a histogram analyzing a particle size distribution of $CeO_2$ particles of Preparation Example 1 and Reference Example 1.

In addition, FIG. 4 is a histogram showing the particle size distribution of ceria particles of Preparation Example 1 and Reference Example 1. The ceria particles (BOC100) of Preparation Example 1 have an average particle diameter of 108 nm and a standard deviation of 10.3, but the ceria particles (HC60) of Reference Example 1 have an average particle diameter of 117 nm and a standard deviation of 22.5. From the fact that the standard deviation of the ceria particles (BOC100) of Preparation Example 1 is much smaller than that of the ceria particles (HC60) of Reference Example 1, it may be confirmed that the ceria particles of Preparation Example 1 exhibit monodisperse.

The ceria particles according to the present disclosure, which have a spherical shape and are monodisperse, have a round and gentle surface without sharply angled edges, and are therefore more preferable in terms of reducing defects, scratches, or dishing flaws in the CMP process.

As shown in FIG. 1, the ceria particle according to Preparation Example 1 has a very unique surface because it is formed of very small fine nanoparticles (particle diameter is about 4.4 nm). In other words, the inorganic particles used in the aqueous dispersion according to the present disclosure are formed as aggregates of nanoparticles or units, and in the case of Preparation Example 1, it may be said that $CeO_2$ atoms (0.54 nm) gather to form nanoparticles (4.4 nm), and the nanoparticles gather to form inorganic particles (108 nm).

Figure 5:
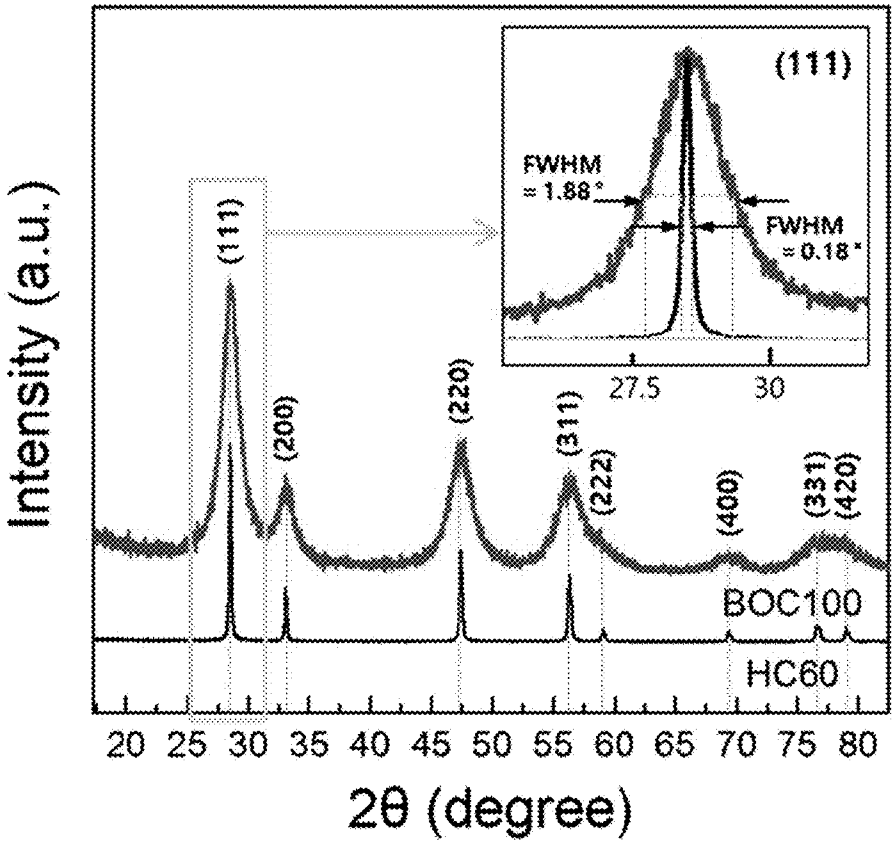
FIG. 5 is an XRD analysis result of $CeO_2$ particles of Preparation Example 1 and Reference Example 1.

FIG. 5 is an XRD analysis result of ceria particles of Preparation Example 1 and Reference Example 1. Both particles have peaks at 28.55°, 33.08°, 47.47°, 56.33°, 59.08°, 69.4°, 76.7° and 79.07° corresponding to the (111), (200), (220), (311), (222), (400), (331) and (420) lattice planes, which correspond to the characteristic peaks of fluorite crystals. However, since the peak of the ceria particles (BOC100) of Preparation Example 1 is much wider, it may be seen that the crystallinity is lower than that of the HC60 particles of Reference Example 1.

In addition, for crystal size comparison, the crystal size was calculated based on the (111) peak. The average crystal size (Lc) was calculated by the Scherrer equation using full-width-of-half-maximum (FWHM) (Monshi, A., M. R. Foroughi, and M. R. Monshi, Modified Scherrer Equation to Estimate More Accurately Nano-Crystallite Size Using XRD. World Journal of Nano Science and Engineering, 2012. 02(03): p. 154-160).

$$L_C = \frac{K * \lambda}{\beta * \cos\theta} \quad \text{[Equation 1]}$$

In the above equation, λ is the X-ray wavelength (nm), β is the FWHM (radians), and K is a constant related to the crystal shape (0.9).

The crystallinity of the particles was calculated as the area under the XRD peak using the Ruland-Vonk method (Iulianelli, G. C. V., et al., Influence of TiO2 nanoparticle on the thermal, morphological and molecular characteristics of PHB matrix, Polymer Testing, 2018. 65: p. 156-162).

$$X_c\ (\%) = \frac{I_c}{I_c + I_a} \times 100 \quad \text{[Equation 2]}$$

In the above equation, Ic is the sum of the area under the crystalline peak and Ia is the sum of the amorphous halo area.

As summarized in Table 1, the crystal size (Lc) of the ceria particles of Preparation Example 1 is 4.4 nm and the crystallinity Xc was 70.5%. The nanoparticle size of 4.4 nm in the schematic diagram of FIG. 1 is based on this XRD analysis result.

TABLE 1

| | FWHM (degree) | Crystal size (nm) | Crystallinity (%) | d-spacing (Å) |
|---|---|---|---|---|
| BOC100 | 1.88 | 4.4 | 70.5 | 3.10 |
| HC60 | 0.18 | 45.5 | 95.8 | 3.12 |

Meanwhile, the particles of Reference Example 1 has a crystal size (Lc) of 45.5 nm and a crystallinity (Xc) of 95.8%. In other words, the crystal size of the particles of Preparation Example 1 according to the present disclosure is much smaller and the crystallinity is much lower than that of the particles of Reference Example 1. From this, it may be seen that the particles according to the present disclosure contain a significant amount of amorphous ceria. The amorphous phase is much softer than the crystalline phase and is therefore desirable for mitigating scratching and dishing defects in the CMP process.

Figure 6:
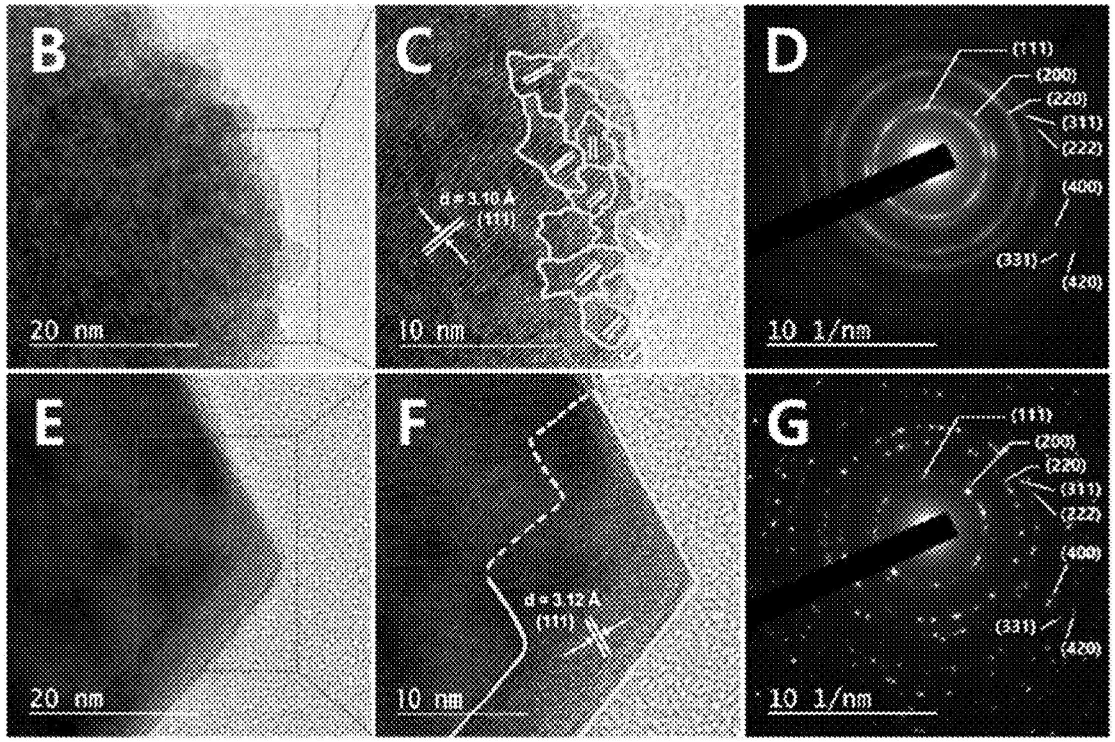
FIG. 6 illustrates HR-TEM images and selected area electron diffraction (SAED) patterns of $CeO_2$ particles according to Preparation Example 1 and Reference Example 1.

B and C of FIG. 6 show HR-TEM images and selected area electron diffraction (SAED) patterns of particles according to Preparation Example 1. The particle of Preparation Example 1 has a d-spacing of 3.10 Å, which corresponds to the (111) lattice plane of ceria.

The size of the phase obtained by drawing the phase boundary in C of FIG. 6 is in the range of 2-5 nm. This corresponds to the crystal size of 4.4 nm shown in FIG. 1. The diffused SAED pattern is shown in D of FIG. 6, showing that the particle of Preparation Example 1 is a mixture of crystalline and amorphous phases (as expressed as spots and rings).

E to G of FIG. 6 show that the particles of Reference Example 1 have a large crystalline phase represented by a unidirectional (111) lattice plane surrounded by boundary lines. This indicates that the particles of Reference Example 1 are formed almost entirely of one or two single crystal phases, which is supported by the crystal size of 45.5 nm and crystallinity of 95.8%.

Figure 7:
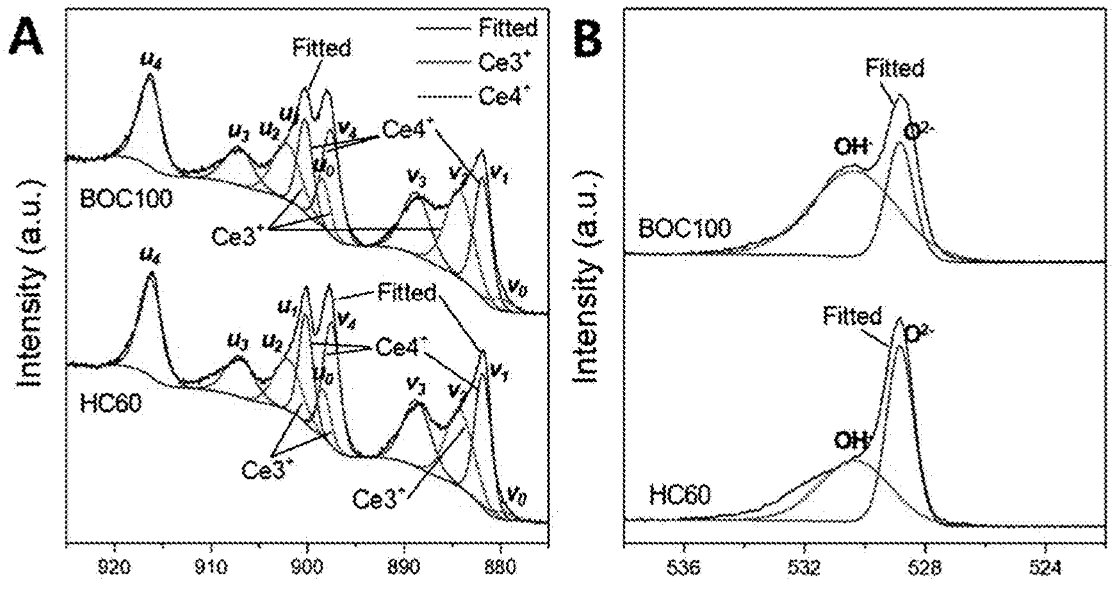
FIG. 7 shows results of X-ray photoelectron spectroscopy (XPS) of $CeO_2$ particles according to Preparation Example 1 and Reference Example 1.

FIG. 7 shows the results of elemental analysis of Ce 3d and O 1s on the particles of Preparation Example 1 and Reference Example 1 by X-ray photoelectron spectroscopy (XPS) in graphs A and B, respectively. A of FIG. 7 shows that the Ce 3d peak is split into Ce $3d_{5/2}$ and C3 $3d_{3/2}$. $v_0$, $v_1$, $v_2$, $v_3$, and $v_4$ belong to Ce $3d_{5/2}$, and $u_0$, u1, u2, u3 and u4 belong to Ce $3d_{3/2}$ (Thromat, N., M. Gautier-Soyer, and G. Bordier, Formation of the CeY203 interface: an in situ XPS study, Surface science, 1996. 345(3): p. 290-302). The peaks $v_0$, $v_2$, $u_0$, and $u_2$ represent the characteristics of $Ce^{3+}$ ions, and the peaks $v_1$, $v_3$, $v_4$, $u_1$, $u_3$, and $u_4$ represent the characteristics of $Ce^{4+}$ ions (Zhang, C. and J. Lin, Visible-light induced oxo-bridged Zr IV-O-Ce III redox centre in tetragonal ZrO 2-CeO 2 solid solution for degradation of organic pollutants, Physical Chemistry Chemical Physics, 2011. 13(9): p. 3896-3905).

The concentrations of $Ce^{3+}$ and $Ce^{4+}$ were obtained as follows.

$$[Ce^{3+}] = v_0 + v_2 + u_0 + u_2$$

$$[Ce^{4+}] = v_1 + v_3 + v_4 + u_1 + u_3 + u_4$$

Table 2 shows specific information of XPS peak assignment.

TABLE 2

| | Peak Assignment (%) | | | | | | | | | | | | Ratio | | |
|---|---|---|---|---|---|---|---|---|---|---|---|---|---|---|---|
| | Ce $3d_{3/2}$ | | | | | Ce $3d_{5/2}$ | | | | | | | | | |
| | $u_4$ | $u_3$ | $u_2$ | $u_1$ | $u_0$ | $v_4$ | $v_3$ | $v_2$ | $v_1$ | $v_0$ | O 1s | | $Ce^{3+}$ | $Ce^{4+}$ | $Ce^{3+}$/ |
| | $Ce^{4+}$ | $Ce^{4+}$ | $Ce^{3+}$ | $Ce^{4+}$ | $Ce^{3+}$ | $Ce^{4+}$ | $Ce^{4+}$ | $Ce^{3+}$ | $Ce^{4+}$ | $Ce^{3+}$ | $OH^-$ | $O^{2-}$ | (%) | (%) | $Ce^{4+}$ |
| Binding Energy (eV) | 916.28 | 907.08 | 902.08 | 900.18 | 898.38 | 897.53 | 888.68 | 884.23 | 881.83 | 879.88 | 530.33 | 528.83 | | | |
| BOC100 | 13.3 | 6.99 | 10.2 | 9.35 | 4.60 | 12.6 | 11.4 | 16.0 | 13.7 | 1.72 | 69.4 | 30.6 | 32.6 | 67.4 | 48.4 |
| HC60 | 14.7 | 7.35 | 8.94 | 10.1 | 4.39 | 13.4 | 12.0 | 13.8 | 14.2 | 1.13 | 47.3 | 52.7 | 28.3 | 71.7 | 39.5 |

According to the above results, the calculated $Ce^{3+}$ concentration of the particles of Preparation Example 1 is 32.6%, which is higher than 28.3% of the particles of Reference Example 1. In addition, the ratio of $Ce^{3+}/Ce^{4+}$ is 48.4 for the particles of Preparation Example 1, and 39.5 for the particles of Reference Example 1, and it may be seen that the concentration of $Ce^{3+}$ contained in the particles of Preparation Example 1 is higher.

In aqueous systems, $Ce^{3+}$ ions present on the surface of ceria particles promote the dissociation of $H_2O$ to form hydroxyl groups (OH groups) on the surface of $CeO_2$. Hydroxyl groups on the surface of particles not only act as active sites but also help physical adsorption of other substances, especially forming Ce—O—Si bonds in the CMP process.

The hydroxyl group concentration of the particles of Preparation Example 1 and Reference Example 1 was measured using O 1s XPS analysis (see B in FIG. 7). The peak at 528.83 eV is for the lattice oxygen ion $O^{2-}$, and the peak at 530.33 eV is for the surface hydroxide ion OH (see Table 2) (Van den Brand, J., et al., Correlation between hydroxyl fraction and O/Al atomic ratio as determined from XPS spectra of aluminum oxide layers. Surface and Interface Analysis: An International Journal devoted to the development and application of techniques for the analysis of surfaces, interfaces and thin films, 2004. 36(1): p. 81-88).

The particles of Preparation Example 1 have 69.4% OH on the surface, which is much more than the 47.3% OH of the particles of Reference Example 1. In addition, the particles of Preparation Example 1 have 30.6% $O^{2-}$ on the surface, which is a much lower concentration than the particles of Reference Example 1 which have 52.7% $O^{2-}$. These results correspond to the fact that the particles of Preparation Example 1 have a much higher concentration of $Ce^{3+}$ ions on the surface than the particles of Reference Example 1. Therefore, it may be said that the $OH^-$ concentration on the surface is proportional to the amount of $Ce^{3+}$ present. As a result, the particles of Preparation Example 1, which have more Ce—OH active sites than the particles of Reference Example 1, may promote the formation of Ce—O—Si bonds between the $SiO_2$ substrate and $CeO_2$ particles in the CMP process.

Density

The density of $CeO_2$ inorganic particles according to Preparation Examples 1 and 2 and Reference Examples 1 and 2 was measured by TAP density measurement (ASTM B527).

TABLE 3

| | Density | Shape |
|---|---|---|
| Preparation Example 1 | 3.6 g/ml | Uniform particles with spherical protrusions |
| Preparation Example 2 | 3.5 g/ml | Uniform particles with spherical protrusions |
| Reference Example 1 | 3.4 g/ml | Angular shape |
| Reference Example 2 | 3.2 g/ml | Irregular shape |

Zeta Potential Measurement

Zeta potential was measured using Malvern's zeta potential analyzer (Nano ZS).

Figure 8:
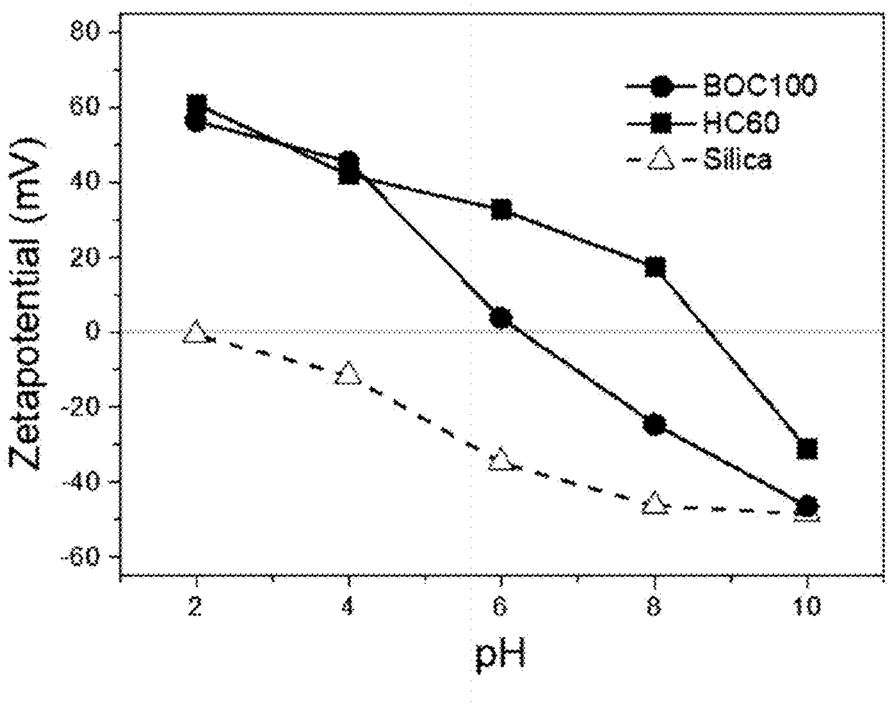
FIG. 8 is a zeta potential measurement result for an aqueous dispersion of $CeO_2$ particles according to Preparation Example 1 and Reference Example 1.

FIG. 8 shows the result of measuring the zeta potential of the spherical protruding $CeO_2$ particle dispersion according to Preparation Example 1 using nitric acid solution (acidic pH adjuster) and ammonia water (basic pH adjuster).

As shown in FIG. 5, the slurry of Preparation Example 1 and Reference Example 1 had a high positive charge of about 60 mV at pH 2, but showed a gradually weaker positive charge as the pH increased. At pH 4 to 4.5, which corresponds to the CMP process conditions, both types of slurries had zeta potentials>30 mV and maintained a stable dispersion state due to electrostatic repulsion. Meanwhile, since the zeta potential of silica particles is negative in a wide range of pH 2 to 10, especially around pH 4, electrostatic attraction occurs due to the opposing charges of the silica substrate and ceria particles. The isoelectric point (IEP) of the particles of Preparation Example 1 in deionized water is approximately pH 6, while the particles of Reference Example 1 are approximately pH 9. This is believed to be because the particles of Preparation Example 1 have a high $OH^-$ concentration, as seen in XPS analysis.

Polishing Performance Test

A slurry was prepared by dispersing the ceria particles of Preparation Example 1 and Reference Example 1 in deionized water at concentrations of 0.1, 0.2, 0.3, 0.4, 0.5, 0.6, 0.7, 0.8, 0.9, 1.0, 2.0, and 3% by weight, respectively, without any other additives.

Figure 9:
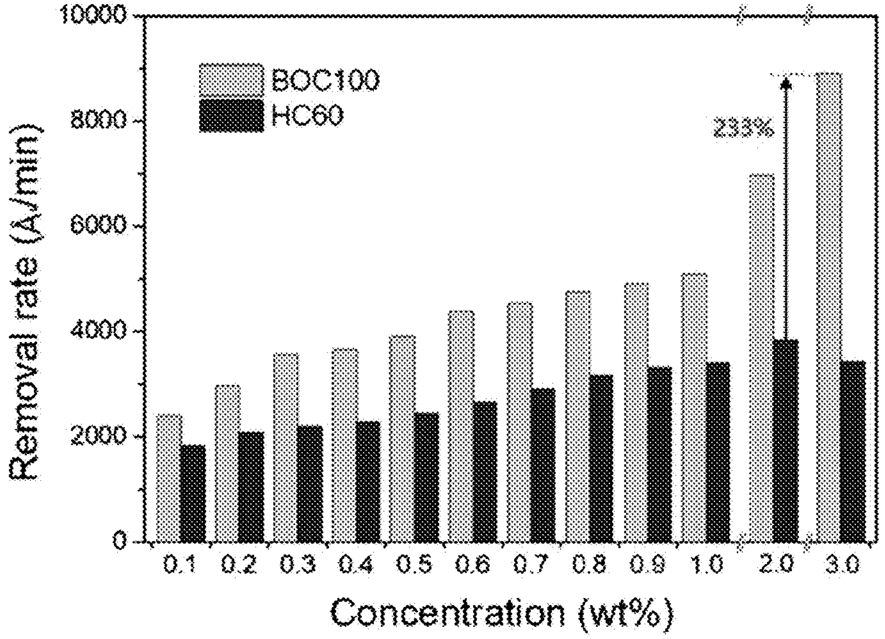
FIG. 9 is a result of comparing removal rates of a silicon film using slurries of $CeO_2$ particles according to Preparation Example 1 and Reference Example 1.

The CMP test was conducted for 1 minute using GnP POLI-400L under the conditions of slurry flow rate: 150 ml/min and fixed head pressure: 4 psi. The initial thickness of $SiO_2$ on the bare wafer was 30,000 Å, and the removal rate (RR) was measured using a refractometer (ST4000-DLX) (see FIG. 9).

The slurry containing the particles of Reference Example 1 is generally known to exhibit the highest polishing performance at a concentration of 0.3% by weight. Accordingly, as a result of comparing RR when the concentration of particles was 0.3% by weight, Preparation Example 1 measured RR=3546 Å/min, and Reference Example 1 measured RR=2197 Å/min.

In addition, the RR of the particles of Reference Example 1 gradually increased until the concentration increased to 2% by weight, and then decreased at 3% by weight. On the other hand, the RR of the particles of Preparation Example 1 increased as the concentration increased, and an RR of 8904 Å/min was achieved at 3% by weight. This is a high value of 233% of the RR of 3823 Å/min achieved by the particles of Reference Example 1 at 2% by weight. From this, it may be seen that the particles of Reference Example 1 are saturated at about 2% by weight, but the particles of Preparation Example 1 are not saturated even at 3% by weight. These results are believed to be due to the high concentration of $Ce^{3+}$ ions and OH-ions present on the particle surface.

Figure 10A:
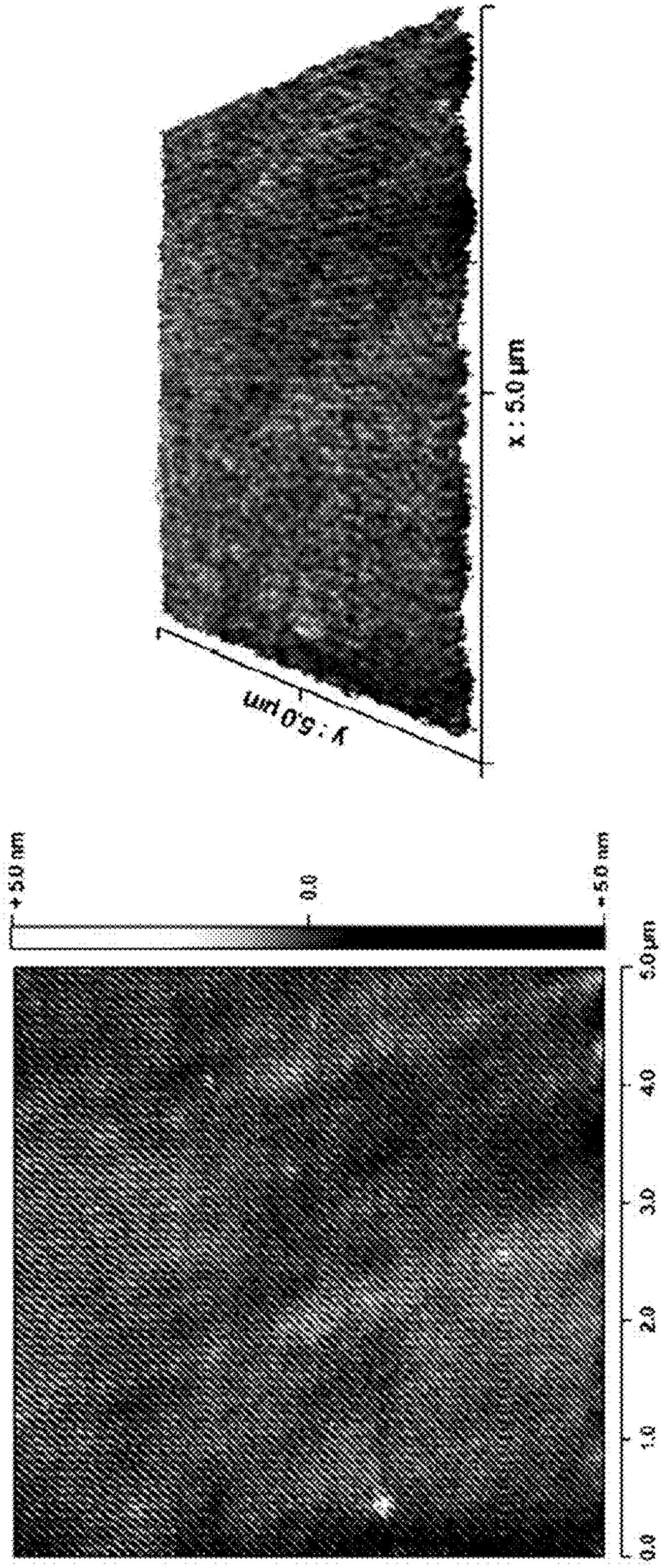
FIGS. 10A and 10B are atomic force microscope images of the wafer surface after a CMP test was performed using $CeO_2$ particles (A) according to Preparation Example 1 and particles (B) according to Reference Example 1, respectively.
Figure 10B:
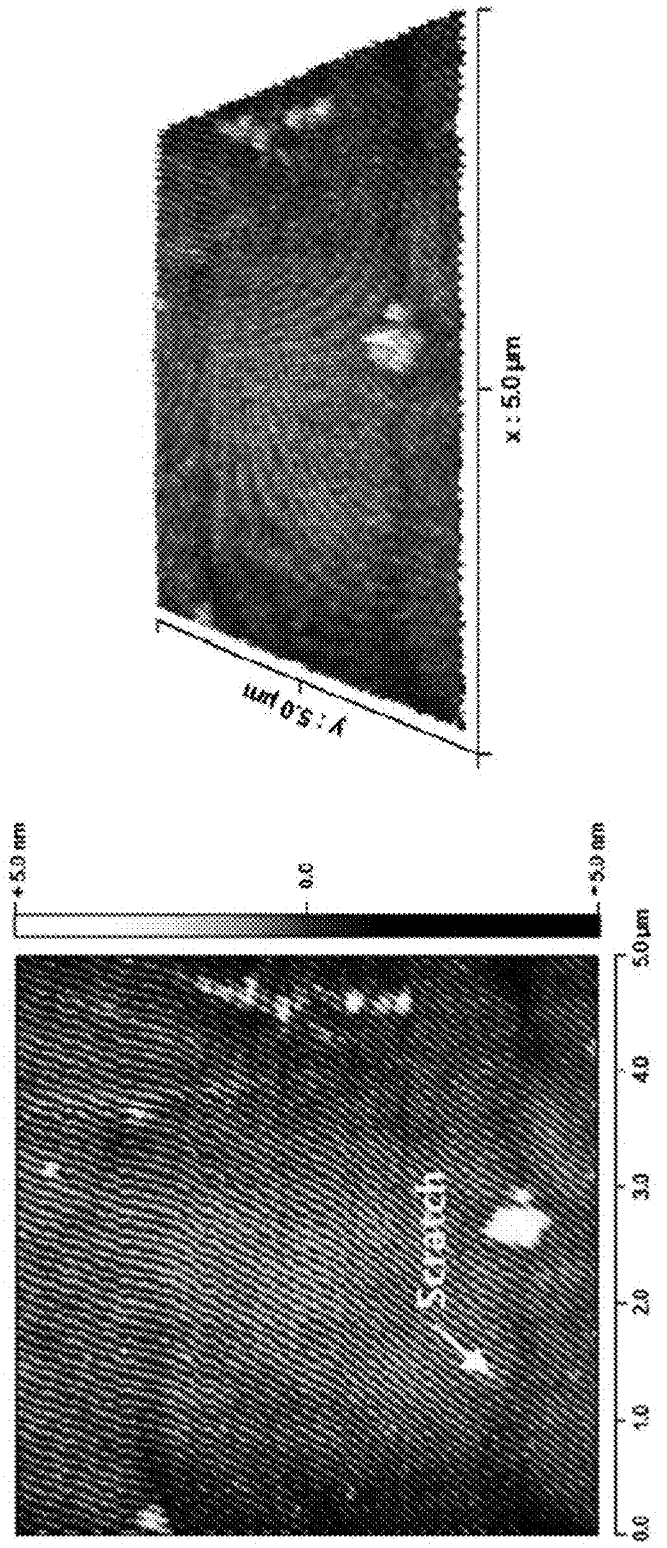

FIGS. 10A and 10B show the wafer surface observed with an atomic force microscope after a CMP test using a slurry in which 0.3% by weight of the particles of Preparation Example 1 and Reference Example 1 were dispersed in deionized water. In the CMP test conducted with the slurry containing the particles of Reference Example 1, deep and large scratch defects occurred on the wafer surface (FIG. 10B), which could be confirmed by the fact that a large amount of particles remained on the surface after the process. On the other hand, it may be seen that the slurry containing the particles of Preparation Example 1 does not cause scratch defects on the wafer surface even after going through the CMP process, and the amount of remaining ceria particles is also significantly small (FIG. 10A).

According to the above results, it may be seen that the inorganic particles prepared by the method according to the present disclosure are uniform in size and that the surface charge is efficiently controlled depending on pH. In addition, as a result of conducting a CMP test in the form of a slurry, it was confirmed that the polishing performance was superior to that of a slurry using commercially available fluorite hexagonal ceria particles, and at the same time, scratch defects on the wafer surface were significantly reduced.

Preparation of Aqueous Dispersion with Amino Acid Addition

Example 1

After dispersing 0.1% by weight (based on the weight of deionized water) of the ceria particles of Preparation Example 1 in deionized water at room temperature, nitric acid was added to prepare an aqueous dispersion in which the pH was adjusted to 4, 4.2, 4.4, 4.6, and 4.8, respectively.

Example 2

After dispersing 0.1% by weight of the ceria particles of Preparation Example 1 in deionized water at room temperature, 1000 ppm (0.1% by weight) (based on the weight of deionized water) of tyrosine was added. Nitric acid was added to the aqueous dispersion to prepare an aqueous dispersion in which the pH was adjusted to 4, 4.2, 4.4, 4.6, 4.8, and 5, respectively.

The polishing performance measurement results using the aqueous dispersions of Examples 1 and 2 are shown in Table 4.

TABLE 4

| | Removal rate (RR) (Å/min) | |
|---|---|---|
| pH | Example 1 (no additive) | Example 2 (with tyrosine) |
| 4 | 2475 | 2503 |
| 4.2 | 5803 | 6644 |
| 4.4 | 6143 | 7875 |
| 4.6 | 7515 | 9138 |
| 4.8 | 5332 | 5965 |

From the above results, it may be seen that the removal rate of the aqueous dispersion according to Example 2 was higher than that of Example 1 and was affected by pH. In addition, it may be seen that the best performance is achieved at pH 4.6.

Example 3

From the results in Table 4, it was confirmed that the removal rate was the best at pH 4.6, so the pH was fixed at 4.6, and the polishing performance was tested by preparing an aqueous dispersion with the addition amount of amino acids changed to 0, 600, 800, and 1000 ppm.

TABLE 5

| pH | Tyrosine addition amount (ppm) | Removal rate(RR) (Å/min) |
|---|---|---|
| 4.6 | 0 (Example 1) | 7515 |
| | 600 | 7754 |
| | 800 | 8010 |
| | 1000 | 9137 |

According to the results in Table 5, it may be seen that the removal rate was improved compared to when tyrosine was not added. In particular, the highest removal rate was achieved when the addition amount was about 0.1% by weight (1000 ppm). The aqueous dispersion according to a preferred embodiment of the present disclosure contains amino acids together with inorganic particles unique to the present disclosure, and when this is used as a CMP polishing slurry, amino acids are adsorbed to the surface of the silicon oxide wafer and strengthen the electrical attraction between the silicon oxide wafer and the inorganic particles, thereby further improving the removal rate.

In the above, although the embodiments of the present disclosure have been mainly described, various changes or modifications may be made at the level of a person skilled in the art in the technical field to which the present disclosure pertains. These changes and modifications may be said to belong to the present disclosure as long as they do not depart from the scope of the technical idea provided by the present disclosure. Therefore, the scope of rights of the present disclosure should be determined by the appended claims.

The invention claimed is:

1. An aqueous dispersion comprising inorganic particles formed by agglomeration of a plurality of elementary particles, wherein the elementary particle has a mixed phase of a crystalline phase and an amorphous phase and has a crystallinity of 90% or less, wherein the elementary particle has a particle diameter of 1 to 50 nm.

2. The aqueous dispersion of claim 1, further comprising an amino acid.

3. The aqueous dispersion of claim 2, wherein, based on a total weight of the aqueous dispersion, a content of the amino acid is 0.01 to 5% by weight, and a content of the inorganic particles is 0.01 to 5% by weight.

4. The aqueous dispersion of claim 2, wherein a weight ratio of the inorganic particles and the amino acid is 100:50 to 200.

5. The aqueous dispersion of claim 2, wherein the amino acid is one or more selected from the group consisting of tyrosine, phenylalanine, and tryptophan.

6. The aqueous dispersion of claim 1, wherein the inorganic particles have a density of 3.0 to 5.0 g/ml, an average particle diameter of 30 to 1000 nm, and a standard deviation of the particle diameter of 20 or less.

7. The aqueous dispersion of claim 1, wherein the inorganic particles have an isoelectric point of pH 5 to 7, and pH of the aqueous dispersion is 3 to 7.

8. The aqueous dispersion of claim 1, wherein the inorganic particles have a surface charge of +30 to +50 mV or −30 to −50 mV of zeta potential in an aqueous dispersion state of pH 4.

9. The aqueous dispersion of claim 1, wherein the inorganic particles are formed of oxides of one or more elements selected from the group consisting of Ga, Sn, As, Sb, Ce, Si, Al, Co, Fe, Li, Mn, Ba, Ti, Sr, V, Zn, La, Hf, Ni, and Zr.

10. The aqueous dispersion of claim 1, wherein the inorganic particles are $CeO_2$ particles, and a $Ce^{3+}/Ce^{4+}$ ion ratio is 5 to 60.

11. The aqueous dispersion of claim 1, wherein the aqueous dispersion is a slurry for CMP.

12. The aqueous dispersion of claim 1, wherein the inorganic particles are prepared by a method comprising:

(a) dissolving a self-assembling surfactant in water or a mixed solvent of water and a solvent compatible with water;

(b) preparing an inorganic precursor solution by dissolving or dispersing an inorganic precursor in the solvent before, after, or simultaneously with step (a); and (c) forming elementary particles having a mixed phase of a crystalline phase and an amorphous phase in a shell formed by the surfactant through a self-assembly reaction of the inorganic precursor and the surfactant, and forming inorganic particles by aggregation of a plurality of the elementary particles.

13. The aqueous dispersion of claim 12, wherein the inorganic particles contained in the aqueous dispersion are inorganic particles of which surface charge is controlled by further comprising treating the inorganic particles obtained in step (c) with an acid and a base.

14. The aqueous dispersion of claim 12, wherein the self-assembling surfactant is one or more selected from the group consisting of cationic surfactants, anionic surfactants, and amphoteric surfactants having a charge capable of binding to the inorganic precursor, and has a functional group capable of condensation reaction or crosslinking reaction.

15. The aqueous dispersion of claim 12, wherein the functional group capable of condensation reaction or cross-linking reaction is one or more selected from the group consisting of an amide group, a nitro group, an aldehyde group, and a carbonyl group.

16. The aqueous dispersion of claim 12, wherein the self-assembling surfactant has a structure of the following Formula 1:

[Formula 1]

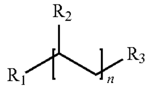

wherein, in Formula 1, $R_1$ and $R_3$ are independently hydrogen atoms, $C_1$-$C_{10}$ alkyl groups, or alkoxy groups, $R_2$ is a substituent of Formula 2 below, and n is a number of 2 or more:

[Formula 2]

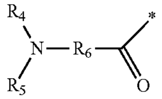

wherein, in Formula 2, $R_4$ and $R_5$ are independently hydrogen atoms, $C_1$-$C_{10}$ alkyl groups, or alkoxy groups, $R_6$ is a $C_1$-$C_{10}$ alkylene group or a single covalent bond, and * represents a connection site.

17. An inorganic particle formed by agglomeration of a plurality of elementary particles wherein the elementary particle has a mixed phase of a crystalline phase and an amorphous phase, which satisfies one or more of (i) to (v) below:

(i) the elementary particles have a crystallinity of 90% or less;

(ii) an aspect ratio (minor axis/major axis) of the inorganic particle is 0.8 or more;

(iii) a particle diameter of the elementary particle is 20 nm or less;

(iv) a standard deviation of a particle diameter of the inorganic particle is 20 nm or less;

(v) the inorganic particle is $CeO_2$ particle, and a $Ce^{3+}/Ce^{4+}$ ion ratio is 40 or more.

* * * * *